Patented Dec. 23, 1930

1,786,404

UNITED STATES PATENT OFFICE

HOYLANDE DENUNE YOUNG, OF CHICAGO, ILLINOIS

DERIVATIVE OF GLYCOL

No Drawing.    Application filed October 31, 1927.    Serial No. 230,165.

This invention relates to a new composition of matter comprising a derivative of a glycol.

An example of the invention is beta-acetyl-oxy-ethyl butyl phthalate,

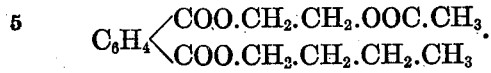

This compound is a colorless liquid of boiling point considerably above that of camphor which it may replace in certain pyroxylin compositions and is an excellent solvent for pyroxylin.

Beta-acetyl-oxy-ethyl butyl phthalate may be prepared as follows: 148 parts by weight of phthalic anhydride are digested for four hours with 74 parts of butyl alcohol to give butyl hydrogen phthalate. To this is then added 104 parts of glycol monoacetate. The heating is now continued in an apparatus provided with a fractionating column. The temperature at the top of this column is maintained at or just above the boiling point of water, so that water which is formed in the esterification, escapes and thus allows the reaction to proceed. When the phthalic anhydride has been substantially completely esterfied, after, say 24 hours' heating, the remaining liquid is dissolved in an equal weight of benzol, mixed with 5% of its weight of decolorizing charcoal and, after several hours' contact, is filtered. The benzol is then removed by distillation in a slow stream of air to leave a residue of beta-acetyl-oxy-ethyl butyl phthalate.

In another preparation of this compound conditions were varied somewhat, as described below.

Mono-butyl phthalate was prepared by warming together 148 parts by weight of phthalic anhydride and 148 parts of butyl alcohol until the phthalic anhydride had gone entirely into solution. This required approximately ½ hour. Ethylene glycol monoacetate (104 parts) and 50 parts of benzene were added to the monobutyl phthalate. The mixture was again heated in an apparatus so arranged that the vapors which consisted mostly of benzol and water rose through an air-cooled tube and then came down through a water cooled condenser; the condensed liquid dropped into a separator from which the aqueous layer could be withdrawn, whereas the benzene layer returned to the reaction vessel. After 24 hours of heating, the benzene and excess butyl alcohol were removed by distillation under a pressure of 35 mm. The residue consisted of beta-acetyl-oxy-ethyl butyl phthalate.

Many details of the preparation may be varied. Also I may use different ingredients. I may use, for example, other dibasic or polybasic acids than phthalic acid, as, for example, citric, succinic, tartaric, phenyl malonic, trimesic, $C_6H_3(COOH)_3$, or succinylosuccinic acid, $C_6H_4(OH)_2(COOH)_2$. Likewise, I may use a different ester of glycol, such as glycol monopropionate, monobutyrate, monoisobutyrate, monovalerate, monobenzoate, or monosalicylate. Also I may use any of these monoester derivatives of a different glycol, such as propylene glycol, 1, 4-butylene glycol, or 1, 3-butylene glycol. Thus I may use, for example, monoesters of 1, 3 butylene glycol represented by the formulas $CH_3.CHOH.CH_2.CH_2OOC.CH_3$, $CH_3.CHOH.CH_2.CH_2.OOC.CH_2.CH_2.CH_3$ and $CH_3.CHOH.CH_2.CH_2.OOC.C_6H_5$. Also, I may vary the alcohol by using, in place of the butyl alcohol of the examples, such alcohols as methyl, ethyl, isopropyl, butyl, isoamyl, normal-amyl, benzyl, phenyl-methyl-carbinol, ethoxy ethanol, $CH_2OH.CH_2.OC_2H_5$, or ethoxy secondary butanol, $$CH_3.CHOH.CH_2.CH_2.OC_2H_5.$$

The compound

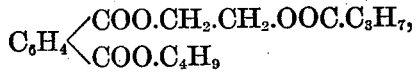

beta-butyryl-oxy-ethyl butyl phthalate, may be prepared as follows:

Butyl alcohol (148 parts) and phthalic anhydride (148 parts) are warmed together for ½ hour, ethylene glycol monobutyrate (132 parts) and benzene (50 parts) added, and the mixture again heated with circulation of the vapors through a system so arranged that on condensation the water layer may be removed and the benzene layer returned to the reaction vessel. After approximately 24 hours' heating, the reaction is practically complete and the benzene, excess butyl alcohol, and traces of other volatile substances, are removed by distillation under a pressure of 5 to 20 mm., the liquid in the still being warmed to a temperature of 110° C. The residue contains the beta-butyryl-oxy-ethyl butyl phthalate. In one preparation, the residue was maintained for 4 hours at 200° C., while a slow stream of air was drawn through at a pressure of 14 mm. of mercury.

Beta-butyryl-oxy-ethyl butyl phthalate is a viscous liquid. It does not distil at or below 300° C. at atmospheric pressure. It is a good solvent for pyroxylin and for ester gum and, hence, is useful as a plasticizer in lacquer. It may be identified by hydrolysis with sodium hydroxide and testing for sodium phthalate, sodium butyrate, ethylene glycol, and butyl alcohol.

Examples of compounds of the type represented by my invention follow:

1. $C_6H_4\diagup\!\!\!\!\diagdown\begin{matrix}COO.CH_2.CH_2.OOC.CH_3\\ COO.CH_2.CH_2.CH_2.CH_3,\end{matrix}$ beta-acetyl-oxy-ethyl normal-butyl phthalate.

2. $C_6H_4\diagup\!\!\!\!\diagdown\begin{matrix}COO.CH_2.CH_2.OOC.R^1\\ COO.CH_2.CH_2.CH_2.CH_3,\end{matrix}$ beta-acyl-oxy-ethyl normal-butyl phthalate, in which $R^1$ represents an alkyl or aryl group, as, for example, methyl, ethyl, propyl, butyl, amyl, benzyl, or tolyl.

3. $C_6H_4\diagup\!\!\!\!\diagdown\begin{matrix}COO.R^2.OOC.R^1\\ COO.CH_2.CH_2.CH_2.CH_3,\end{matrix}$ an acyl-oxy-alkyl normal-butyl phthalate, in which $R^1$ represents an alkyl or aryl radical as before and $R^2$ an alkylene group, as for example, $.CH_2.CH_2.$, $.CH_2.CH_2.CH_2.$, or $.CH(CH_3).CH_2.CH_2.$ 4. $C_6H_4\diagup\!\!\!\!\diagdown\begin{matrix}COO.R^2.OOC.R^1\\ COO.R^3,\end{matrix}$ an acyl-oxy-alkyl alkyl or aryl phthalate, in which $R^1$ and $R^2$ have each the same meaning as above, and $R^3$ represents an alkyl or aryl group, as for example, methyl, ethyl, isopropyl, butyl, isoamyl, amyl, benzyl, or tolyl.

5. $C_6H_4\diagup\!\!\!\!\diagdown\begin{matrix}COO.R^2.OOC.R^1\\ COO.R^4.O.R^5,\end{matrix}$ an acyl-oxy-alkyl alkoxy-alkyl phthalate, in which $R^1$ and $R^2$ have each the same meaning as above, $R^4$ represents an alkylene group as, for example, $.CH_2.CH_2.$, $.CH_2.CH_2.CH_2.$, or $.CH(CH_3).CH_2.CH_2.$, and $R^5$ represents an alkyl group as, for example, the methyl, ethyl, isopropyl, butyl, isoamyl, or normal amyl radical.

6. $R^6\diagup\!\!\!\!\diagdown\begin{matrix}COO.R^2.OOC.R^1\\ COO.R^3,\end{matrix}$ an acyl-oxy-alkyl alkyl ester of a dibasic acid in which $R^1$, $R^2$, and $R^3$ have each the same meaning as above, and $R^6(COO)_2$ represents the radical of a dibasic acid as, for example, tartaric, succinic, phenyl malonic, or ortho-phthalic acid.

7. $R^8\!\!\diagup\!\!\!\!-\!\!\!\diagdown\begin{matrix}COO.R^2.OOC.R^1\\ COO.R^3.\\ COO.R^7,\end{matrix}$ an acyl-oxy-alkyl alkyl alkyl or aryl ester of a tribasic acid, in which $R^1$, $R^2$, and $R^3$ have the same meanings as above, $R^8(COO)_3$ represents the radical of a tribasic acid as, for example, citric or trimesic acid, and $R^7$, an alkyl or aryl radical.

Any compound of this type gives, on hydrolysis with sodium hydroxide, salts of the acids whose radicals are present, a glycol, and one or more monohydric alcohols. By identifying the several products of hydrolysis, by well known tests, we can identify the compound from which the hydrolysis products were derived. Thus beta-acetyl-oxy-ethyl butyl phthalate may be identified by hydrolysis with sodium hydroxide solution and testing separately for sodium phthalate, sodium acetate, ethylene glycol, and butyl alcohol.

When the radicals $R^1$ to $R^8$ contain each no more than 5 carbon atoms in addition to those present in a benzene ring (that is, in the phenyl radical), the compounds in liquid condition are solvents for pyroxylin and are useful in pyroxylin compositions.

Examples of lacquer compositions containing a typical one of these new solvents follow. All proportions are by weight.

*Formula #1. Lacquer film*

| | Parts |
|---|---|
| Pyroxylin | 3 |
| Beta-acetyl-oxy-ethyl butyl phthalate | 1 |

*Formula No. 2. Pyroxylin lacquer*

| | Parts |
|---|---|
| Pyroxylin | 3 |
| Beta-acetyl-oxy ethyl butyl phthalate | 1 |
| Butyl acetate | 15 |
| Butanol | 5 |
| Ethyl acetate | 5 |
| Ethanol | 5 |
| Toluol | 20 |
| 58° Bé. naphtha | 10 |

*Formula No. 3. Pyroxylin and resin lacquer*

| | Parts |
|---|---|
| Formula #2 | 64 |
| Ester gum ("Paramet") | 2 |

Formula #4. Pigmented lacquer

|  | Parts |
|---|---|
| Formula #3 | 66 |
| Zinc oxide | 1 |

The term "acyl" as used in the specification and claims means the radical left after removing the hydroxyl from the carboxyl group of an organic acid. Some common acyl groups, under this definition, are acetyl, $CH_3CO.$; propionyl, $CH_3.CH_2.CO.$; butyryl, $CH_3.CH_2.CH_2.CO.$; and benzoyl, $C_6H_5CO.$ By the term "acyl-oxy-alkyl" wherever used by me, I mean the radical formed by replacing the hydrogen, of a hydroxy-alkyl group, by an acyl radical. Examples of acyl-oxy-alkyls follow:

| | |
|---|---|
| $.CH_2.CH_2.OOC.CH_3$ | acetyl-oxy-ethyl |
| $.CH_2.CH_2.OOC.CH_2CH_2.CH_3$ | butyryl-oxy-ethyl |
| $.CH(CH_3).CH_2.CH_2.OOC.CH_3$ | acetyl-oxy-butyl |
| $.CH_2.CH_2.OOC.C_6H_5$ | benzoyl-oxy-ethyl |

I claim:

1. A composition of matter comprising an ester of a polycarboxylic acid in which the hydrogen of at least one of the carboxyl groups is replaced by an acyl-oxy-alkyl radical and the hydrogen of another carboxyl group is replaced by a monovalent hydrocarbon radical.

2. A composition of matter comprising an ester of a dicarboxylic acid in which the hydrogen of one of the carboxyl groups is replaced by an acyl-oxy-alkyl radical and the hydrogen of the other carboxyl group is replaced by an alkyl group.

3. A composition of matter comprising an ester of a dicarboxylic aromatic acid in which the hydrogen of one of the carboxyl groups is replaced by an acyl-oxy-alkyl radical and the hydrogen of the other carboxyl group is replaced by an alkyl group.

4. A composition of matter comprising an ester of a phthalic acid in which the hydrogen of one of the carboxyl groups is replaced by an acyl-oxy-alkyl radical and the hydrogen of the other carboxyl group is replaced by an alkyl group.

5. A composition of matter comprising an ester of an ortho-phthalic acid in which the hydrogen of one of the carboxyl groups is replaced by an acyl-oxy-alkyl radical and the hydrogen of the other carboxyl group is replaced by an alkyl group.

6. An ester of a polycarboxylic acid in which the hydrogen of at least one of the carboxyl groups is replaced by a beta-acyl-oxy-ethyl radical and the hydrogen of another carboxyl group is replaced by a monovalent hydrocarbon radical.

7. An ester of a polycarboxylic acid in which the hydrogen of at least one of the carboxyl groups is replaced by a beta-acetyl-oxy-ethyl radical and the hydrogen of another carboxyl group is replaced by a monovalent hydrocarbon radical.

8. An ester of a polycarboxylic acid in which the hydrogen of at least one of the carboxyl groups is replaced by a beta-acetyl-oxy-ethyl radical and the hydrogen of another carboxyl group is replaced by a monovalent hydrocarbon radical containing not more more than five carbon atoms.

9. A composition of matter comprising a beta-acetyl-oxy-ethyl alkyl phthalate.

10. An ester of a polycarboxylic acid in which the hydrogen of at least one of the carboxyl groups is replaced by an acyl-oxy-alkyl radical and the hydrogen of another carboxyl group is replaced by a butyl radical.

11. An ester of a dicarboxylic acid in which the hydrogen of one of the carboxyl groups is replaced by an acyl-oxy-alkyl radical and the hydrogen of the other carboxyl group is replaced by a butyl radical.

12. A composition of matter comprising acyl-oxy-alkyl butyl phthalate.

13. A composition of matter comprising beta acetyl-oxy-ethyl-butyl phthalate.

14. An ester of phthalic acid having the grouping of atoms represented by the following formula

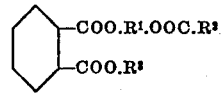

in which $R^1$ represents an alkylene radical and $R^2$ and $R^3$ each a monovalent hydrocarbon radical.

15. An ester of phthalic acid having the grouping of atoms represented by the following formula

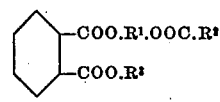

in which $R^1$ represents an alkylene radical, $R^2$ represents an alkyl group, and $R^3$ represents a monovalent hydrocarbon group.

16. An ester of phthalic acid having the grouping of atoms represented by the following formula

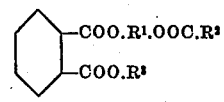

in which $R^1$ represents an alkylene radical, and $R^2$ and $R^3$ represent alkyl groups.

17. An ester of phthalic acid having the grouping of atoms represented by the following formula

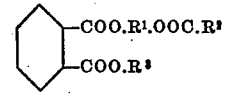

in which $R^1$ represents an alkylene radical, and $R^2$ and $R^3$ represent different alkyl groups.

18. A composition of matter whose molecular structure contains the radical

in which $R^1$ represents an alkylene and $R^2$ a monovalent hydrocarbon radical.

19. A composition of matter possessing the grouping of atoms represented by the formula

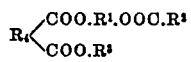

in which $R^4$ represents a bivalent hydrocarbon radical, $R^1$ an alkylene radical, $R^2$ and $R^3$ monovalent hydrocarbon radicals, none of the groups $R^1$, $R^2$, or $R^3$ containing more than five carbon atoms each.

HOYLANDE DENUNE YOUNG.